United States Patent
Synal

(10) Patent No.: US 10,341,810 B2
(45) Date of Patent: Jul. 2, 2019

(54) GEOLOCATION COMPATIBILITY FOR NON-RCS DEVICES

(71) Applicant: T-Mobile USA, Inc., Bellevue, WA (US)

(72) Inventor: Adrian Synal, Snohomish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/190,917

(22) Filed: Jun. 23, 2016

(65) Prior Publication Data
US 2017/0374504 A1  Dec. 28, 2017

(51) Int. Cl.
| | |
|---|---|
| H04W 4/02 | (2018.01) |
| H04L 29/08 | (2006.01) |
| H04W 4/14 | (2009.01) |
| H04L 12/58 | (2006.01) |
| H04W 4/021 | (2018.01) |

(52) U.S. Cl.
CPC ............ *H04W 4/021* (2013.01); *H04L 51/18* (2013.01); *H04L 67/02* (2013.01); *H04L 67/24* (2013.01); *H04W 4/14* (2013.01)

(58) Field of Classification Search
CPC ......... H04L 51/18; H04L 67/02; H04L 67/24; H04W 4/021; H04W 4/14
See application file for complete search history.

(56) References Cited

U.S. PATENT DOCUMENTS

| | | | |
|---|---|---|---|
| 2001/0030667 A1* | 10/2001 | Kelts .................... | G06F 3/0481 715/854 |
| 2003/0177196 A1* | 9/2003 | Bhasin .............. | G06F 17/30902 709/213 |
| 2007/0140439 A1* | 6/2007 | Olrik ....................... | H04L 51/38 379/67.1 |
| 2007/0162680 A1* | 7/2007 | Mitchell ........... | G06F 17/30241 711/1 |
| 2008/0208444 A1* | 8/2008 | Ruckart ............... | G01C 21/005 701/412 |
| 2013/0010051 A1* | 1/2013 | Shlaimoun .............. | H04W 4/14 348/14.02 |
| 2013/0066624 A1* | 3/2013 | Pattan ................... | G06F 17/289 704/2 |
| 2013/0130711 A1* | 5/2013 | Bergsbjork ............. | H04W 4/02 455/456.1 |
| 2014/0057667 A1* | 2/2014 | Blankenship ......... | H04L 67/303 455/500 |

(Continued)

*Primary Examiner* — Dinh Nguyen
(74) *Attorney, Agent, or Firm* — Lee & Hayes, P.C.

(57) ABSTRACT

In an IMS communications infrastructure, RCS communications may be received from originating devices and forwarded to receiving devices. Specifically, RCS provides for geolocation messages to allow an originating user to send his or her location to a receiving user. In certain cases, however, the receiving user may have a device that does not support RCS. In this case, the IMS infrastructure extracts location coordinates from the XML content of the RCS geolocation message and uses them to construct an HTML hyperlink to an online mapping service. The hyperlink is then sent as part of an SMS or MMS message to the legacy device of the receiving user. Upon selecting the hyperlink, the receiving user is taken to a web page or other resource that shows a map of the location indicated by the RCS geolocation message.

18 Claims, 3 Drawing Sheets

(56) References Cited

U.S. PATENT DOCUMENTS

| | | | | |
|---|---|---|---|---|
| 2014/0317205 A1* | 10/2014 | Rande | ............... | H04L 12/1822 |
| | | | | 709/206 |
| 2014/0372557 A1* | 12/2014 | Buckley | ............... | H04L 67/104 |
| | | | | 709/217 |
| 2015/0066641 A1* | 3/2015 | Dudley | ............. | G06Q 30/0261 |
| | | | | 705/14.51 |
| 2016/0286027 A1* | 9/2016 | Lee | .................. | H04M 1/72552 |

* cited by examiner

GEOLOCATION COMPATIBILITY FOR NON-RCS DEVICES

BACKGROUND

The use of mobile devices such as cellular telephones and other devices with cellular data connectivity is proliferating. Almost everyone has some sort of mobile, data-enabled device, and many people have multiple devices. Users can access different networks using a single mobile device, and can access voice, text, and multimedia data from various network-accessible and Internet-accessible entities. Furthermore, mobile device complexity is increasing, with more and more advanced and power-efficient processors, display interfaces, and applications that provide greatly improved user experiences.

In many cases, a single user may have multiple devices configured to receive a particular type of communication. For example, a user may have a telephone number that is associated with several devices. When receiving a telephone call, each of the devices may ring, and the user may pick up the telephone call on any of the devices. Similarly, a user may have a messaging application installed on multiple devices and may receive messages on all the devices.

Rich Communication Services (RCS) are services designed to provide enhanced communications between mobile devices, including mobile devices that are supported by different operators. Among other things, RCS provides for enhanced messaging, which may include chat, file sharing, location sharing, and so forth, and which may be used for communications with multiple devices of a single user.

In some cases, RCS allows a user's device to determine the capabilities of other users' devices, and various types of communications are initiated by an originating device only when those types of communications are supported by a receiving device. In some cases, however, a receiving user may have more than one device associated with a single telephone number. When this is the case, it may also happen that some of the receiving user's devices support RCS while others do not. This may at times cause problems, because while an originating device may initiate an RCS session based on the capabilities of a receiving user's primary device or another RCS-compatible device, the receiving user may wish instead or also to receive the communication on a different device that does not support RCS.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
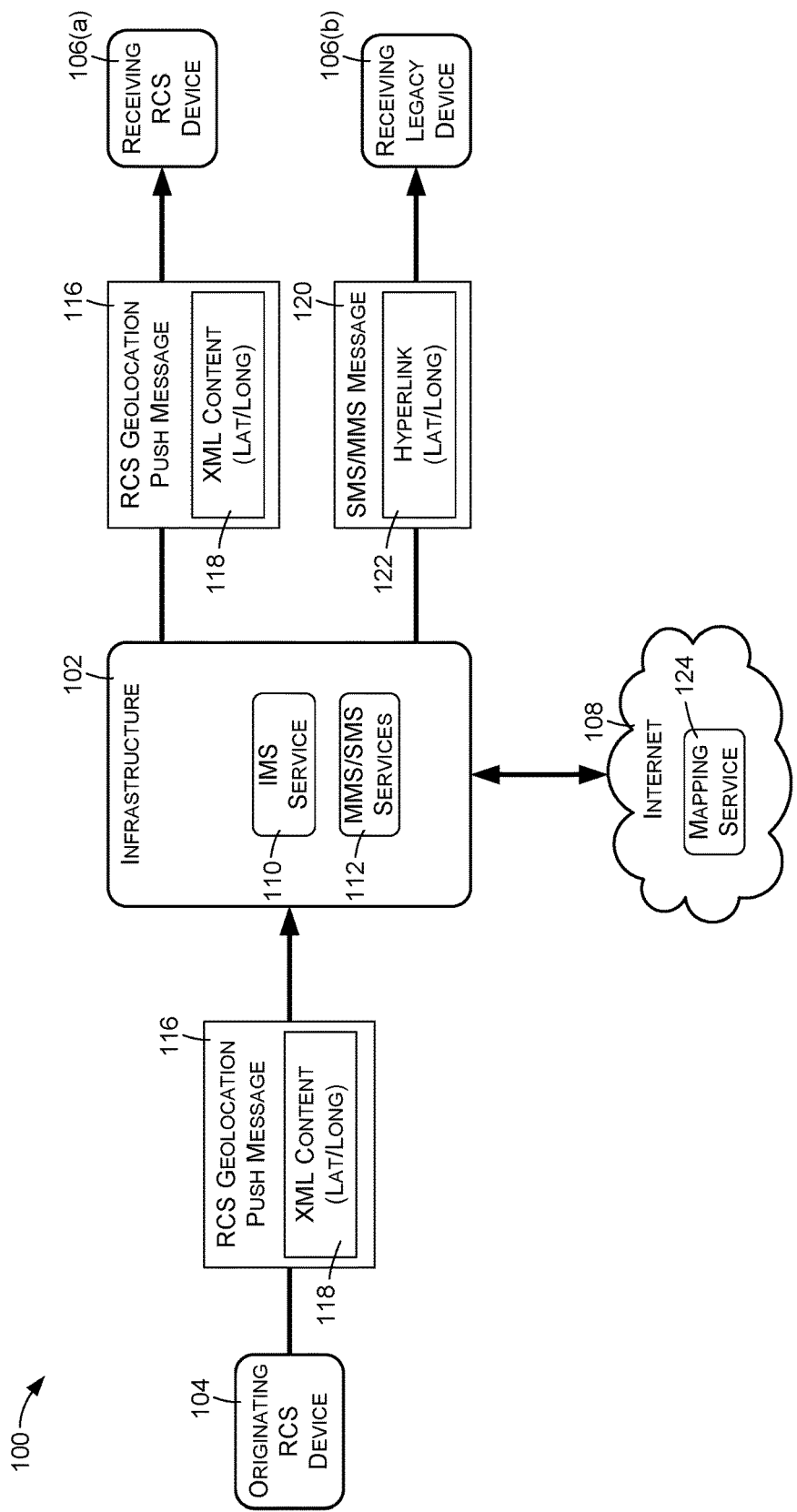
FIG. 1 is a block diagram illustrating an example communications infrastructure that provides communications with and between multiple devices.

The described implementations provide devices, systems, and methods for geolocation sharing in systems in which some receiving devices support rich communication services (RCS) and others do not. In described embodiments, for example, a user may have multiple devices that are configured to receive communications addressed to a common user identifier, such as a user name, an email address, a telephone number, etc. Some of the devices may support RCS, while others may not. Examples of devices include smartphones, tablet computers, wearable devices, and personal computers, all of which may configured to receive of communications directed to a single, common telephone number.

RCS includes capabilities for sharing geolocation information with other users. When communicating between an originating device and a receiving device, both of which support RCS, the originating device may use the RCS File Transfer service to provide geographic coordinates to a receiving RCS device. When using the RCS geolocation protocol, the geographic coordinates are specified using an XML (extensible markup language) element that specifies a longitude and a latitude of the originating device.

Upon receiving an XML-formatted geolocation message, the receiving RCS-compatible device parses the embedded XML to extract the specified geographic coordinates. The receiving device may then present the information to the user of the receiving device in various ways. For example, the receiving device may be configured to display a map to the receiving user, indicating the current location of the originating user.

RCS provides functionality that allows an originating device to determine the capabilities of other devices. Because of this functionality, the originating device may be configured to initiate RCS-based communications only with devices that also support RCS services. In some situations, however, RCS-based communications may end up being directed to legacy devices that do not support RCS or that are not currently available for RCS communications. As one example, a receiving user's primary device may support RCS communications, but the receiving user may have other devices that do not support RCS. In this case, the originating device may initiate an RCS communication based on the RCS capabilities of the receiving user's primary device, while the receiving user may be using a secondary device that does not support RCS. As another example, an RCS communication channel may be established between an originating device and a receiving device, and the receiving device may subsequently move outside the service range of its service provider and may therefore become unavailable for RCS communications.

In accordance with embodiments described below, the core network of a service provider, such as a mobile cellular service provider, receives an RCS geolocation message from an originating device, wherein the RCS geolocation message is addressed using a user identifier (ID) of a receiving user. In response to receiving the RCS geolocation message, the core network sends geolocation information to one or more devices of the receiving user. For each receiving device, if RCS communications are currently available with the device, the core network sends the geolocation information through an established RCS communication channel, using the XML format mentioned above. Otherwise, if RCS communications are not currently available with a particular receiving device of the receiving user, the core network extracts the geolocation information from the XML content of the RCS message and uses it to construct an SMS (short messaging service) or MMS (multimedia messaging service) message (referred to collectively herein as an SMS/MMS message) that specifies the location indicated by the geographical coordinates in a format that can be understood or acted upon from within the content of the SMS/MMS message. Specifically, in described embodiments, the core network constructs an HTML (hypertext markup language) hyperlink that references an online mapping service or other interactive mapping application, and sends the hyperlink to the receiving device as an SMS/MMS message.

The HTML hyperlink is constructed to reference a network-accessible mapping service, such as the types of mapping services that are commonly accessed through Internet Web browsers and/or installed device applications. Mapping services such as this can be accessed to provide and display graphical maps, satellite images, and/or other location dependent or geographical information. The hyperlink is constructed to contain the latitude and longitude that have been extracted from the XML content of the RCS message, in a format that is predefined by the mapping service. For example, the hyperlink may be a string such as http://www.google.com/maps/places/lat,lng where "www.google.com/maps/places" is a URL (uniform resource locator) of an online mapping service, lat is a path argument specifying the latitude coordinate obtained from the XML content and lng is a path argument specifying the longitude coordinate obtained from the XML content. Note that "google.com/maps/places" is used merely as one well-known example of an online mapping service. More generally, the hyperlink may reference any of various mapping services and applications, including mapping applications and geolocation applications that may be present on the receiving device, which may or may not utilize Internet-based services or other network-based services. Furthermore, in some embodiments a map may be provided in the SMS/MMS message as a picture, in addition to or instead of the hyperlink.

The core network may determine whether RCS communications are available with a receiving device in various ways. As one example, the core network may receive an error message after attempting to send an RCE communication to a receiving device that does not support RCS services. As another example, the core network may maintain information about subscribing devices, including information indicating whether the subscribing devices support RCS services. The core network may also use RCS capability discovery mechanisms to determine whether certain devices support RCS, including devices that are subscribers of different network providers.

Upon receiving an SMS/MMS message that contains a hyperlink as described above, the user of the receiving device may select the hyperlink, which causes the user's device to navigate to a web page or application that displays a map and that displays the specified location within the displayed map.

FIG. 1 illustrates a mobile communication system 100 in which the described techniques may be implemented. The system 100 comprises a communications infrastructure 102 that provides communications between an originating RCS device 104 and multiple receiving devices 106. Each of the originating and receiving devices 104 and 106 may comprise a device having network communication capabilities such as a smartphone, a telephone handset, a headset, a wearable device, a computer, a personal computer, a desktop computer, a laptop computer, a tablet computer, etc. The communication capabilities of the devices 104 and 106 may include Wi-Fi capabilities, cellular or other telephony capabilities, and/or other wired or wireless network communication capabilities.

FIG. 1 shows a single originating device 104 and multiple receiving devices 106. The originating device 104 is associated with an originating user. All of the illustrated multiple receiving devices 106 are associated with a single receiving user and a corresponding user identifier (ID). The receiving devices include an RCS device 106(a) that supports RCS communications and a legacy device 106(b) that does not support at least certain types of RCS communications such as RCS geolocation messages.

Although only a single originating device 104 is illustrated, many different originating devices 104, associated with many different users, may access the communication infrastructure 102 in order to initiate communications with one or more devices of receiving users. Similarly, although only the receiving devices 106 associated with a single user are shown in FIG. 1, large numbers of devices, associated with many users, may be used in the system 100. Furthermore, any given device may act as either an originating device or a receiving device in a given communication.

The communications infrastructure 102 may comprise a telephonic communications network, as an example. In some cases, for example, the communications infrastructure may comprise a wireless, cellular communications network implemented in accordance with the System Architecture Evolution (SAE) communication standard and provided by a cellular communication services provider. In certain implementations, the system 100 may be implemented at least in part as a long-term evolution (LTE) cellular network. More generally, the system 100 may be implemented using any of various wireless networking technologies, including GSM (global system for mobile), GPRS (general packet radio service), EDGE (enhanced data rates for GSM evolution), UMTS (universal mobile telecommunications system), CDMA (code-division multiple access), various types of packet-switched networks, IEEE 802.11 networks (generally referred to as Wi-Fi), and so forth.

Note that different ones of the devices 104 and 106 may use different wireless networking technologies for accessing the telephonic communications network. For example, one device may use Wi-Fi connectivity while another device may use a cellular connection. Yet another device may connect to the communications network through a wired Ethernet connection.

In LTE and other cellular environments, the communications infrastructure 102 may comprise a number of geographically dispersed base stations (not shown), comprising radio transceivers and antennas for communicating with corresponding transceivers of the devices 104 and 106. In many cases, the cellular infrastructure may provide connectivity with the Internet 108 and various services and servers that are accessible through the Internet. Through the Internet 108, the devices 104 and 106 may communicate with a host of servers and services. Services available through the Internet may include websites, data sources, commerce sites, telephony services, messaging services, and so forth.

The communications infrastructure 102 may include one or more services that support communications between originating devices and destination devices. The communications may include voice communications, video communications, textual communications, and so forth. For purpose of this disclosure, FIG. 1 shows IMS (IP multimedia Subsystem) services 110 and SMS/MMS services 112.

The IMS services 110 are provided by the communications infrastructure 102 as part of its core network, and typically implement RCS functionality. In the context described herein, the IMS services 110 provide geolocation services, such as by allowing RCS-compatible devices to communicate geolocation information with each other using file transfer methods supported by RCS.

The SMS/MMS services 112 are provided by the communications infrastructure 102 to support SMS and/or MMS messaging. SMS supports legacy text messaging between supported cellular devices. MMS extends SMS to support, in addition, the communication of audio and video between supported cellular devices.

In certain situations, the originating RCS device 104 sends an RCS geolocation message 116 to a user identifier associated with the receiving RCS devices 106. The originating RCS device 104 may have previously established an RCS communication session with the receiving RCS device 106(a), and the RCS geolocation message 116 may be sent through this previously established RCS communication session, via the IMS services 110 of the communications infrastructure 102. The message 116 is directed to a particular user ID, which corresponds to the user of the receiving devices 106(a).

The RCS geolocation message 116 contains XML content 118 that specifies a geographic latitude and longitude, representing the current location of the originating device 104, which may have been determined by the originating device 104 using its GPS (Global Positioning System) capabilities. In accordance with certain implementations of RCS, the XML content may comprise what is known as a PIDF-LO (Presence Information Data Format Location Object) that specifies the latitude and longitude. Note that RCS also support communications of other locations, not limited to the current location of the originating device 104.

Upon receiving the RCS geolocation message 116, the IMS service 110 determines which subscribing devices are associated with the user ID to which the message 116 has been addressed. In FIG. 1, it is assumed that the message 116 is addressed to the user of the devices 106(a) and 106(b). The IMS service 110 then attempts to forward the message 116 to the receiving devices 106(a) and 106(b), which correspond to the specified user ID.

For any particular receiving device 106, the IMS services 110 determines whether the receiving device 106 supports RCS services, and more specifically whether the receiving device 106 supports RCS geolocation messages. If the receiving device 106 does support RCS geolocation messages, as is the case with the RCS-compatible device 106(a), the IMS service 110 sends or forwards the RCS message 116 to the receiving device.

As described above, the RCS message 116 contains the XML content 118, specifying a geographic location. Upon receiving the RCS message 116, the receiving RCS device 106(a) parse the XML content 118 to determine the indicated latitude and longitude. Depending upon RCS client implementation details, the receiving RCS device 106(a) may then display a map on the receiving device 106(a), indicating the location specified by the XML content 118.

If the receiving device 106 does not support RCS geolocation messages, however, as is the case with the legacy device 106(b), the IMS service 110 parses the XML content 118 of the message 116 to determine the specified latitude and longitude. The IMS service 110 then constructs an SMS/MMS message 120 and sends the SMS/MMS message 120 to the legacy device 106(b). The SMS/MMS message 120 is constructed to contain an HTML hyperlink 122 that references a network-accessible mapping service 124. More specifically, the hyperlink 122 contains and/or specifies the latitude and longitude specified by the XML content 118. The hyperlink 122 is formatted so that it instructs the mapping service 124 to provide a map of the geographic area that encompasses the location indicated by the given latitude/longitude, and to also indicate the specific location corresponding to the given latitude/longitude.

As an example, the SMS/MMS message 120 may contain the following text:
 Please select the following link to see the location of User A
 http://www.google.com/maps/places/lat,lng
where lat is the latitude coordinate obtained from the XML content 118 and lng is the longitude coordinate obtained from the XML content 118. Underlining indicates that the text comprises a selectable hyperlink.

More generally, the link may comprise a URL (uniform resource locator) such as the following:
 http://mapURL/lat,lng
where mapURL is the domain of a map services provider. Note that the hyperlink may be provided in various different formats, depending on the implementation and expectations of the mapping service 124. In this example the latitude and longitude are provided as path arguments.

Upon receiving the SMS/MMS message 120, the user may select the presented hyperlink 122. Depending on the particular nature of the device 106(b) and its configuration, selecting the hyperlink 122 may open an Internet browser that navigates to the hyperlink 122 and displays a map provided by the mapping service 124, wherein the map is of an area surrounding the location specified by the location coordinates. Alternatively, the device 106(b) may open a mapping application that responds to the hyperlink 122, and that similarly displays a map that encompasses an area that includes the latitude and longitude specified by the SMS/MMS message 122. Such an application may in some cases communicate with the mapping service 124 to obtain the map, or may instead retrieve the map from resources stored on the device 106(b).

The mapping service 124 may be an Internet-based mapping service. As mentioned above, the mapping service 124 may be accessible through an Internet browser of the legacy device 106(b) and/or through an application that is installed on and that is executed by the legacy device 106(b). The mapping service 124 may, for example, comprise an interactive website that allows users to search for locations and that displays maps of such locations on an Internet browser. In some cases, the mapping service 124 may also support navigational services, and may provide directions to users for navigating to specified locations.

Figure 2:
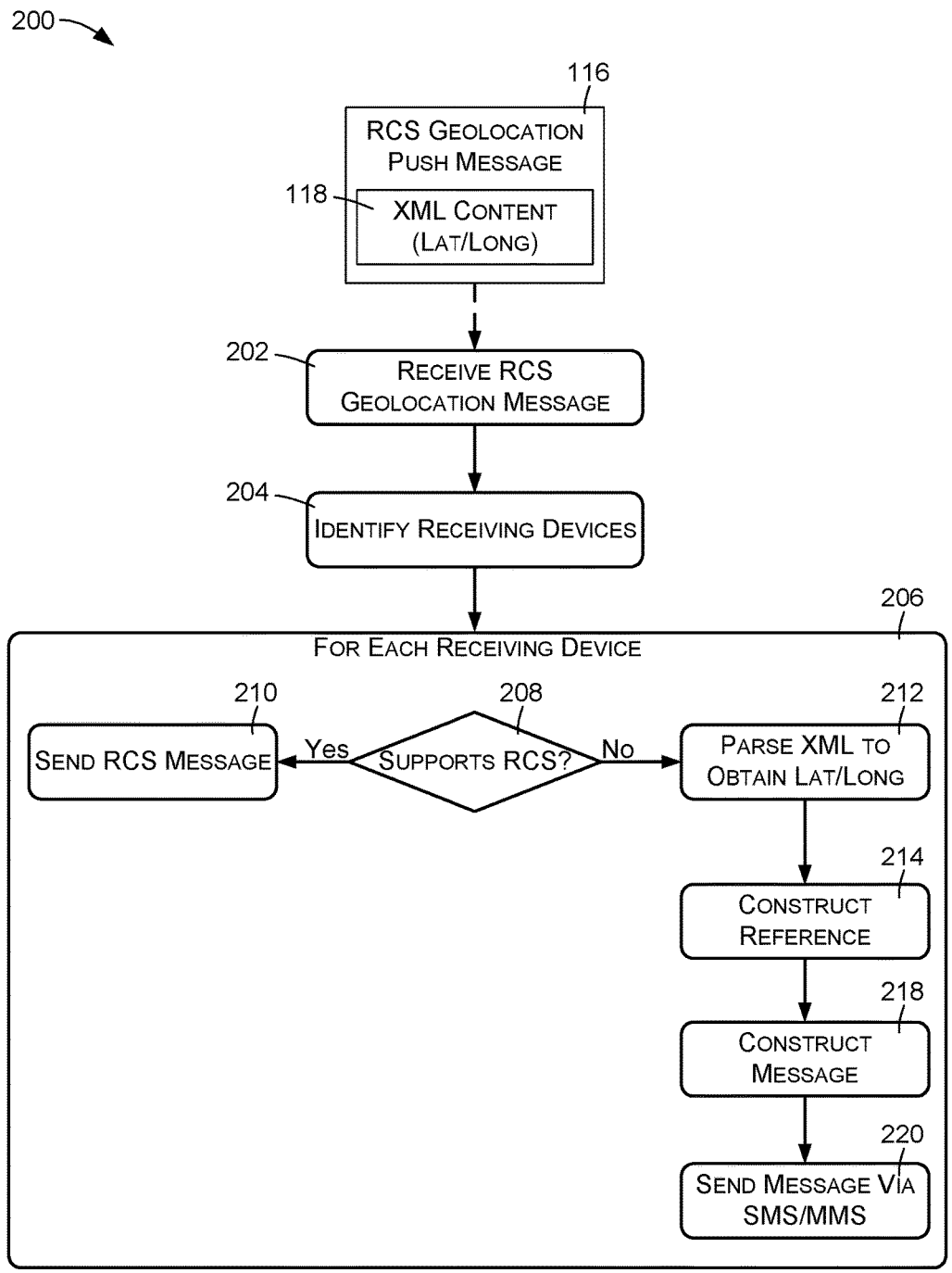
FIG. 2 is a flow diagram illustrating an example method of providing geolocation messages from an originating device to one or more receiving devices.

FIG. 2 shows an example method 200 that may be performed by a communication infrastructure, such as an IMS component of a cellular network provider or other communications provider, to provide geolocation messages to receiving devices that do not support RCS. Although the method 200 is described as being implemented within the core network of a cellular network provider, similar techniques and methods may be used by other messaging services, including messaging services that are provided as Internet-based and Web-based services.

An action 202 comprises receiving an RCS geolocation message 116 from an originating device, which may in some cases comprise a mobile telecommunications device such as a cell phone, a smartphone, a tablet computer, a portable computer, an autonomous device, a wearable device, a device accessory, etc. The originating device supports RCS and has capabilities for determining its geographical coordinates and/or for receiving an indication of a location from a user. The RCS geolocation message 116 may comprise what RCS refers to as a push message, and further may comprise a file transfer message containing XML content 118 that specifies a location in terms of a latitude and a longitude. The latitude and longitude may indicate the current location of the originating device or may represent any other location as specified by the user of the originating device and/or by software of the originating device.

The RCS geolocation device specifies or is otherwise associated with a recipient user identity (ID) that is uniquely associated with a desired recipient of the RCS message 116. In many cases, the recipient user ID may comprise a telephone number, corresponding to a primary device of a recipient user. Other examples of user IDs include email addresses, etc.

An action 204 comprises identifying any receiving devices associated with the recipient user ID. As discussed above, a user ID may be associated with multiple devices of a user. In this example, the recipient user ID of the message 116 may be associated with multiple devices of the recipient user, such as the devices 106(*a*) and 106(*b*).

A group of actions 206 are then performed for each identified receiving device, starting with an action 208 that comprises determining whether the receiving device supports RCS, or more specifically, whether the receiving device supports RCS geolocation services. The action 206 may be performed by referencing registration data, which may include a capabilities database specifying capabilities of devices that are registered with the communications infrastructure. For example, the action 206 may comprise registering mobile devices with a cellular communications infrastructure and, in response or in conjunction with the registering, recording capabilities of the registered devices. Determining capabilities of mobile devices can then be performed by referencing the recorded capabilities.

In some cases, RCS capability discovery mechanisms may be used to determine capabilities of the receiving devices.

In some cases, it may be determined that a receiving device does not currently support RCS services by means of receiving an error message from a recipient device in response to a communication with the recipient device.

If the receiving device does support RCS geolocation services, an action 210 is performed of sending the RCS message 116 to the RCS-compatible receiving device. The action 210 may comprise forwarding the RCS message 116 to the RCS-compatible receiving device without alteration, so that the forwarded message 116 includes the XML content 118 and its specified latitude and longitude. Upon receiving such a message, the RCS-compatible receiving device may automatically present a graphical map or other location information to the user of the RCS-compatible recipient device.

If in the action 208 it is found that the receiving device is a legacy device and or does not support RCS geolocation services, an action 212 is performed of parsing the XML content 118 of the message 116 to extract and determine the latitude and longitude specified by the XML content. An action 214 is then performed, comprising constructing a reference to the location specified by the latitude and longitude. The reference, as an example, may comprise a hyperlink as described above, which may in turn comprise a URL to a network-accessible and/or Internet-based interactive mapping service. The latitude and longitude may, for example, be specified as path arguments within a URL of an online mapping service. Generally, the constructed reference is to a resource that provides graphical maps, wherein such a resource may comprise a mapping service, an application, a data store, a website that provides graphical maps or other geographical images, and so forth.

An action 218 comprises constructing a location message that will be sent to the legacy receiving device. As an example, the location message may comprise a textual message, and may contain the hyperlink or other reference constructed in the action 214. In other cases, action 218 may comprise obtaining a map image corresponding to the location specified by the RCS message 116. For example, the location message may contain a picture, wherein the picture is of a map or other image corresponding to the location specified by the message 116.

An action 220 comprises sending the constructed textual message to the legacy recipient device as an SMS message and/or as an MMS message. Upon receiving the SMS/MMS message, a user may select the hyperlink to navigate to a website or application that shows a map of the area corresponding to the location originally specified by the RCS message 116.

Figure 3:
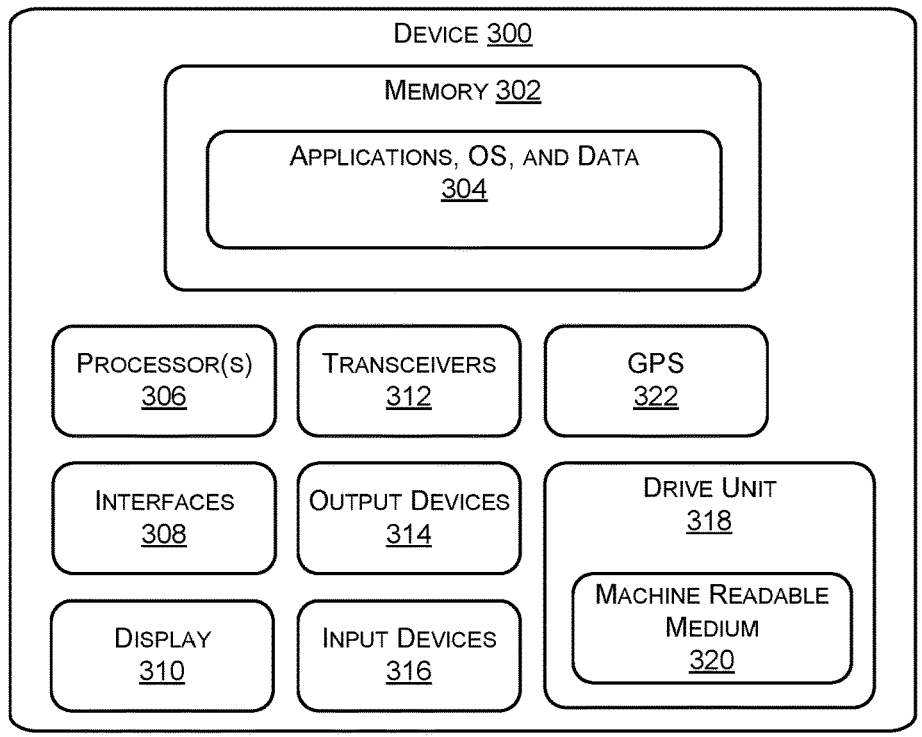
FIG. 3 is a block diagram of an example communication device that may be used in conjunction with the example methods described herein.

FIG. 3 illustrates an example device 300 in accordance with various embodiments. The device 300 is illustrative of example components of the devices 104 and 106.

The device 300 may include a memory 302, which may store applications, an operating system (OS), and data 304. The device 300 further includes processor(s) 306, interfaces 308, a display 310, radio transceivers 312, output devices 314, input devices 316, and a drive unit 318 including a machine readable medium 320.

In various embodiments, the memory 302 includes both volatile memory and non-volatile memory. The memory 302 can also be described as non-transitory computer storage media and may include removable and non-removable media implemented in any method or technology for storage of information, such as computer readable instructions, data structures, program modules, or other data. The applications, OS, and data 304 are stored in the memory 302. Additionally, in some embodiments, the memory 302 may include a SIM (subscriber identity module), which is a removable smart card used to identify a user of the device 300 to a service provider network.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 300. Any such non-transitory computer-readable media may be part of the device 300.

In some embodiments, the processor(s) 306 is a central processing unit (CPU), a graphics processing unit (GPU), or both CPU and GPU, or other processing unit or component known in the art.

In various embodiments, the interfaces 308 are any sort of interfaces known in the art. The interfaces 308 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 310 may comprise a liquid crystal display or any other type of display commonly used in telecommunication devices or other portable devices. For example, display 310 may be a touch-sensitive display screen, which may also act as an input device or keypad, such as for providing a soft-key keyboard, navigation buttons, or the like.

In some embodiments, the transceivers 312 include any sort of transceivers known in the art. For example, the transceivers 312 may include radio radios and/or radio transceivers and interfaces that perform the function of transmitting and receiving radio frequency communications via an antenna, through a cellular communication network of a wireless data provider. The radio interfaces facilitate wireless connectivity between the device 300 and various cell towers, base stations and/or access points.

In some embodiments, the output devices 314 include any sort of output devices known in the art, such as a display (already described as display 310), speakers, a vibrating mechanism, or a tactile feedback mechanism. The output devices 314 also include ports for one or more peripheral devices, such as headphones, peripheral speakers, or a peripheral display.

In various embodiments, the input devices 316 include any sort of input devices known in the art. For example, the input devices 316 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 300 may also have a GPS (global positioning system) receiver 322 for determining the current location of the device 400 based on signals received from satellites.

The machine readable medium 320 stores one or more sets of instructions (e.g., software) such as a computer-executable program that embodies operating logic for implementing and/or performing any one or more of the methodologies or functions described herein. The instructions may also reside, completely or at least partially, within the memory 302 and within the processor 306 during execution thereof by the device 300. The memory 302 and the processor 306 also may constitute machine readable media 320.

Figure 4:
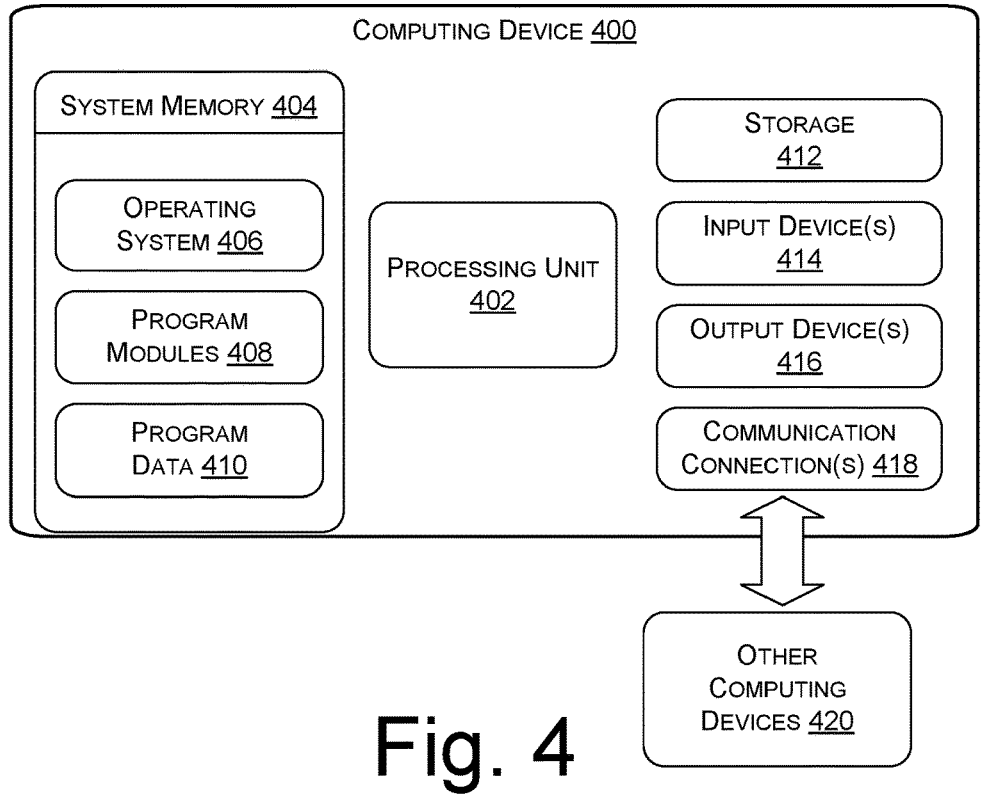
FIG. 4 is a block diagram of an example computing device that may be used to implement various components of a communications infrastructure, including servers of the communications infrastructure network described herein.

FIG. 4 is a block diagram of an illustrative computing device 400 such as may be used to implement various components of the communication infrastructure 102 including servers, routers, gateways, administrative components, etc. For example, one or more computing devices 400 may be used to implement the IMS service 110 and the MMS/SMS services 112.

In various embodiments, the computing device 400 may include at least one processing unit 402 and system memory 404. Depending on the exact configuration and type of computing device, the system memory 404 may be volatile (such as RAM), non-volatile (such as ROM, flash memory, etc.) or some combination of the two. The system memory 404 may include an operating system 406, one or more program modules 408, and may include program data 410.

The computing device 400 may also include additional data storage devices (removable and/or non-removable) such as, for example, magnetic disks, optical disks, or tape. Such additional storage is illustrated in FIG. 4 by storage 412.

Non-transitory computer storage media of the computing device 400 may include volatile and nonvolatile, removable and non-removable media implemented in any method or technology for storage of information, such as computer readable instructions, data structures, program modules, or other data. The system memory 404 and storage 412 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such non-transitory computer-readable storage media may be part of the computing device 400.

In various embodiment, any or all of the system memory 404 and storage 412 may store programming instructions which, when executed, implement some or all of the function functionality described above as being implemented by the server infrastructure 102, the IMS service 110, the MMS/SMS services 112, and/or any other services implemented by the infrastructure 102.

The computing device 400 may also have input device(s) 414 such as a keyboard, a mouse, a touch-sensitive display, voice input device, etc. Output device(s) 416 such as a display, speakers, a printer, etc. may also be included. The computing device 400 may also contain communication connections 418 that allow the device to communicate with other computing devices 420.

Although features and/or methodological acts are described above, it is to be understood that the appended claims are not necessarily limited to those features or acts. Rather, the features and acts described above are disclosed as example forms of implementing the claims.

What is claimed is:

1. A method performed by a cellular communication infrastructure, the method comprising:
receiving an RCS (rich communication services) file transfer message from an originating mobile device, the RCS file transfer message containing XML (extensible markup language) content, the XML content specifying a latitude and a longitude corresponding to a location of the originating mobile device, the RCS file transfer message specifying a recipient user identifier;
determining that the recipient user identifier is associated with a first mobile device and a second mobile device;
receiving an error message from the first mobile device in response to an RCS communication with the first mobile device;
determining that the first mobile device does not support RCS in response to at least one of receiving the error message or by referencing a recorded capabilities list storing capabilities of the first mobile device;
in response to determining that the first mobile device does not support RCS, (a) constructing a textual message containing a hyperlink to a network-accessible mapping service, the hyperlink specifying the latitude and the longitude and (b) sending the textual message to the first mobile device as an SMS (short messaging service) message or as an MMS (multimedia messaging service) message;
determining that the second mobile device supports RCS; and
in response to determining that the second mobile device supports RCS, sending the RCS file transfer message to the second mobile device, wherein sending the RCS file transfer message to the second mobile device causes the second mobile device to automatically present a graphical map.

2. The method of claim 1, wherein the hyperlink comprises a URL (uniform resource locator), the latitude and the longitude being specified as path arguments within the URL.

3. The method of claim 1, wherein the hyperlink comprises a URL (uniform resource locator) of an interactive Internet-based mapping service.

4. The method of claim 1, further comprising:
registering the first and second mobile devices with the cellular communications infrastructure.

5. The method of claim 1, wherein the XML content comprises a PIDF-LO (Presence Information Data Format Location Object).

6. A system comprising:
one or more processors;
one or more non-transitory computer-readable media; and
computer-executable instructions stored on the one or more non-transitory computer-readable media that, when executed on the one or more processors, cause the one or more processors to perform actions comprising:
receiving an RCS (rich communication services) message from a first mobile device, the RCS message specifying a location and a recipient user identifier;
determining that the recipient user identifier is associated with a second mobile device;
receiving an error message from the second mobile device in response to an RCS communication with the second mobile device;
determining that the second mobile device does not support RCS geolocation services in response to at least one of receiving the error message or by referencing a recorded capabilities list storing capabilities of the second mobile device;
extracting the location from the RCS message;
constructing a location message indicating the location; and
sending the location message to the second mobile device as a short messaging service (SMS) message or as a multimedia messaging service (MMS) message, wherein sending the location message to the second mobile device as the SMS message or as the MMS message causes the second mobile device to automatically present a graphical map.

7. The system of claim 6, the actions further comprising determining that the recipient user identifier is associated with a third mobile device;
determining that the third mobile device supports RCS geolocation services; and
sending the RCS message to the third mobile device.

8. The system of claim 6, wherein the RCS message comprises a file transfer message.

9. The system of claim 6, wherein the location message also contains a reference to an interactive Internet-based mapping service.

10. The system of claim 6, wherein the location message also contains a reference to a resource that provides graphical maps.

11. The system of claim 6, wherein the location message also contains a hyperlink to a website that provides additional graphical maps.

12. A method, comprising:
receiving an RCS (rich communication services) message, the RCS message specifying a location and a user identifier;
identifying a first communication device and a second communication device that are associated with the user identifier;
receiving an error message from the first communication device in response to an RCS communication with the first communication device;
determining that the first communication device does not support RCS geolocation messages in response to at least one of receiving the error message or by referencing a recorded capabilities list storing capabilities of the first communication device;
extracting the location from the RCS message;
constructing a location message that specifies the location; and
sending the location message as a short messaging service (SMS) message or as a multimedia messaging service (MMS) message, wherein sending the location message as the SMS message or as the MMS message to the first communication device causes the first communication device to automatically present a graphical map.

13. The method of claim 12, further comprising:
determining that the second communication device supports the RCS geolocation messages; and
sending the RCS message to the second communication device.

14. The method of claim 12, wherein constructing the location message comprises creating a hyperlink to a mapping service, wherein the hyperlink specifies the location.

15. The method of claim 12, wherein the location message comprises a hyperlink to a website that provides additional graphical maps, and wherein the hyperlink specifies the location.

16. The method of claim 12, wherein constructing the location message comprises obtaining a map image corresponding to the location and including the map image in the location message.

17. The method of claim 12, wherein extracting the location from the RCS message comprises parsing XML content of the RCS message.

18. The method of claim 1, further comprising determining that the originating mobile device previously established an RCS communication session with the second mobile device and wherein sending the RCS file transfer message to the second mobile device comprises using the RCS communication session.

* * * * *